United States Patent
Nagafuchi et al.

(10) Patent No.: US 10,181,031 B2
(45) Date of Patent: Jan. 15, 2019

(54) CONTROL DEVICE, CONTROL SYSTEM, CONTROL METHOD, AND CONTROL PROGRAM

(71) Applicant: NIPPON TELEGRAPH AND TELEPHONE CORPORATION, Chiyoda-ku (JP)

(72) Inventors: Yukio Nagafuchi, Musashino (JP); Yasuhiro Teramoto, Musashino (JP); Toshiharu Kishi, Musashino (JP); Takaaki Koyama, Musashino (JP); Hideo Kitazume, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 171 days.

(21) Appl. No.: 15/503,134

(22) PCT Filed: Aug. 26, 2015

(86) PCT No.: PCT/JP2015/074072
§ 371 (c)(1),
(2) Date: Feb. 10, 2017

(87) PCT Pub. No.: WO2016/035644
PCT Pub. Date: Mar. 10, 2016

(65) Prior Publication Data
US 2017/0228539 A1 Aug. 10, 2017

(30) Foreign Application Priority Data

Sep. 1, 2014 (JP) .................................. 2014-176946

(51) Int. Cl.
*H04L 29/06* (2006.01)
*G06F 21/55* (2013.01)
(Continued)

(52) U.S. Cl.
CPC .......... *G06F 21/554* (2013.01); *G06F 21/552* (2013.01); *H04L 29/06* (2013.01);
(Continued)

(58) Field of Classification Search
CPC . H04L 63/14; H04L 63/1408; H04L 63/1416; H04L 63/1425; H04L 63/1441;
(Continued)

(56) References Cited

U.S. PATENT DOCUMENTS

2008/0320116 A1* 12/2008 Briggs .............. H04L 29/12377
709/221
2011/0252469 A1 10/2011 Cho et al.
(Continued)

FOREIGN PATENT DOCUMENTS

EP     3 208 976 A1    8/2017
JP     2004-334455 A   11/2004
(Continued)

OTHER PUBLICATIONS

Extended European Search Report dated Jan. 19, 2018 in Patent Application No. 15837313.4.
(Continued)

*Primary Examiner* — Edward Zee
(74) *Attorney, Agent, or Firm* — Oblon, McClelland, Maier & Neustadt, L.L.P.

(57) ABSTRACT

A cloud controller performs, when an attack on a VM in any of data centers in a system is detected, setting of NAT of a private IP address of a VM(A), for a boundary router of each data center other than a data center that the VM(A) belongs to, the VM(A) being a victim. Next, the cloud controller performs setting for a redirecting device in the same data center as the VM(A), such that the redirecting device redirects access from a user terminal to a host under a boundary router of any of the respective data centers other
(Continued)

than the data center. Thereafter, the cloud controller changes a private IP address of the VM(A) in a NAT setting of a boundary router of the data center to a private IP address of the redirecting device.

10 Claims, 10 Drawing Sheets

(51) Int. Cl.
  *H04L 29/08* (2006.01)
  *G06F 15/16* (2006.01)
  *G06F 21/56* (2013.01)
  *H04L 12/741* (2013.01)
  *H04L 12/24* (2006.01)
  *H04L 12/701* (2013.01)

(52) U.S. Cl.
  CPC .......... *H04L 63/14* (2013.01); *H04L 63/1458* (2013.01); *H04L 63/1491* (2013.01); *H04L 67/2814* (2013.01); *G06F 15/16* (2013.01); *G06F 21/56* (2013.01); *G06F 21/566* (2013.01); *H04L 41/12* (2013.01); *H04L 45/00* (2013.01); *H04L 45/74* (2013.01); *H04L 63/1408* (2013.01); *H04L 63/1425* (2013.01); *H04L 67/327* (2013.01)

(58) Field of Classification Search
  CPC ............... H04L 63/145; H04L 63/1458; H04L 63/1466; H04L 63/16; H04L 63/18; H04L 63/20; H04L 63/205
  See application file for complete search history.

(56) References Cited

U.S. PATENT DOCUMENTS

2013/0304927 A1   11/2013   Abu-Amara et al.
2014/0373138 A1   12/2014   Park et al.
2015/0128246 A1*  5/2015    Feghali ............... H04L 63/0209
                                                          726/13

FOREIGN PATENT DOCUMENTS

JP      2011-221993 A       11/2011
WO   WO 2013/002538 A2    1/2013
WO   WO 2013/002538 A3    1/2013

OTHER PUBLICATIONS

"Draft Revised Recommendation G.959.1 Version 8.3", International Telecommunication Union, Telecommunication Standardization Sector, TD 50 (WP 2/15), XP017560248, May 2005, 46 pages.
International Search Report dated Sep. 29, 2015, in PCT/JP2015/074072, filed Aug. 26, 2015.
Nagafuchi, et al. "Proposal of loadbalancing DDos traffic for virtual datacenters", IEICE Technical Report, in 2014-48, Jul. 2014, with English translation, ( 27 pages).
"OpenStack", http://www.openstack.org, retrieved on Jun. 16, 2014, ( 2 pages).
Ishii, et al. "Open Source Iaas Cloud Platform OpenStack", NTT Technical Jornal vol. 23, No. 8, 2011, with English Translation, ( 14 pages).
Kitazume, et al. "Network Virtualization Technology Supporting Cloud Services", NTT Technical Journal vol. 23, No. 10, 2011, with English translation, (16 pages).
Nagafuchi, et al. "Proposal of the routing control method to avoid redundant route in the live migration networks", IEICE Technical Report, IN2013-48, Jul. 2013, with English translation, ( 27 pages).
"Countermeasures for Reducing DDos Attacks", http://www.cisco.com/web/JP/product/hs/security/tad/tech/pdf/dda_wp.pdf, retrieved on Jun. 16, 2014, with English translation, ( 33 pages).
"URL Redirection", Wikipedia, https://en.wikipedia.org/wiki/URL_redirection, retrieved on Nov. 10, 2016, (11 pages).

* cited by examiner

NAT TABLE

| GLOBAL IP ADDRESS | PRIVATE IP ADDRESS |
|---|---|
| aaa.bbb.ccc.101 | xxx.yyy.zzz.101 |

GLOBAL IP ADDRESS

| DATA CENTER | GLOBAL IP ADDRESS |
|---|---|
| DATA CENTER 1 | aaa.bbb.ccc.0/24 |
| DATA CENTER 2 | ddd.eee.fff.0/24 |
| DATA CENTER 3 | ggg.hhh.iii.0/24 |

CONTROL DEVICE, CONTROL SYSTEM, CONTROL METHOD, AND CONTROL PROGRAM

FIELD

The present invention relates to a control device, a control system, a control method, and a control program.

BACKGROUND

A technique called OpenStack (registered trademark) has been widespread as a technique for constructing a virtual environment. Further, a technique for connecting plural locations, such as plural data centers, via a virtual Layer 2 (L2) network by using this OpenStack (registered trademark) has also been proposed (Non-Patent Literature 1 to Non-Patent Literature 3).

CITATION LIST

Non-Patent Literature

Non-Patent Literature 1: OpenStack, [online], [retrieved on Jun. 16, 2014] from the Internet <URL:http://www.openstack.org/>

Non-Patent Literature 2: Hisaharu Ishii, et al., "Open Source IaaS Cloud Platform OpenStack", NTT Technical Journal Vol. 23, No. 8, 2011

Non-Patent Literature 3: Hideo Kitazume, et al., "Network Virtualization Technology Supporting Cloud Services", NTT Technical Journal Vol. 23, No. 10, 2011

Non-Patent Literature 4: Yukio Nagafuchi et al., "Proposal of the routing control method to avoid redundant route in the live migration networks", IEICE Technical Report, IN2013-48, pp. 71-76, July 2013

Non-Patent Literature 5: "Countermeasures for Reducing DDoS Attacks", [online], [retrieved on Jun. 16, 2014] from the Internet <URL:http://www.cisco.com/web/JP/product/hs/security/tad/tech/pdf/dda_wp.pdf>

Non-Patent Literature 6: Wikipedia, "HTTP Redirect", [online], [retrieved on Jun. 16, 2014] from the Internet <URL:http://ja.wikipedia.org/wiki/%E3%83%AA%E3%83%80%E3%82%A4%E3%83%AC%E3%82%AF%E3%83%88_(HTTP)>

Non-Patent Literature 7: Yukio Nagafuchi et al., "Proposal of loadbalancing DDos traffic for virtual datacenters", IEICE Technical Report, IN2014-48, pp. 107-112, July 2014

SUMMARY

Technical Problem

When a particular Internet Protocol (IP) device in a data center receives a Distributed Denial of Service (DDoS) attack with a large number of packets, the attack packets concentrate at a firewall (FW) installed at an entrance of the data center. As a result, there has been a risk that the IP device in the data center may be unable to continue to provide a service to an authorized user (a user other than the attacker). Therefore, an object of the present invention is to solve the above mentioned problem and to continue to provide a service even if an attack, such as a DDoS attack, is received.

Solution to Problem

To solve the problem, a control device that performs control for boundary routers, which are installed in plural locations mutually connected via a virtual network and which relay communication between devices in the locations and an external network, the control device comprising: a NAT setting unit that performs, for a boundary router of each location other than a location that a victim device belongs to, when concentration of packets at a device in any of the locations is detected, setting of network address translation (NAT) of an IP address of the victim device, the victim device being a device where the concentration of packets has been detected; a redirection setting unit that performs setting for a redirecting device installed in any of the locations, such that the redirecting device redirects access to the redirecting device, to a host under a boundary router of any of the locations other than the location that the victim device belongs to; and a NAT changing unit that changes, after the redirection has been set, a private IP address of the victim device in a NAT setting of a boundary router of the location that the victim device belongs to, to a private IP address of the redirecting device.

Advantageous Effects of Invention

According to the present invention, a service is able to continue to be provided even if an attack, such as a DDoS attack, is received.

DESCRIPTION OF EMBODIMENTS

Hereinafter, with reference to the drawings, modes (embodiments) for carrying out the present invention will be described. The present invention is not limited by these embodiments.

(Overall Configuration)

First of all, by use of FIG. 1, an overall configuration of a control system (system) according to an embodiment will be described. The system includes data centers (data centers 1, 2, and 3), user terminals 10 (10A to 10E), a Domain Name System (DNS) server 40, and a cloud controller (control device) 50. These are connected to one another via a network 60, such as the Internet.

Each of the data centers includes a boundary router 30, and may have one or more VMs installed therein. Herein, a case, where the data center 1 includes a boundary router 30A, the data center 2 includes a boundary router 30B, and the data center 3 includes a boundary router 30C, will be described as an example. In this embodiment, a case, where devices installed in the data centers are virtual machines (VMs), will be described as an example, but the devices may be devices other than the VMs.

The boundary routers 30 (30A, 30B, and 30C) are connected to the network 60, and relay communication between the user terminals 10 and the respective VMs of the respective data centers. The respective boundary routers 30 divide the data centers 1, 2, and 3 formed of the virtual Layer 2 (L2) network 21 to the same common network segment 22 and network 60.

For example, for an interface 31 of the boundary router 30A, an IP address (global IP address), "aaa.bbb.ccc.101", which is selected from an IP address band, "aaa.bbb.ccc.0/24", which is allocated to the data center 1, is set. Similarly, for the boundary router 30B, an IP address selected from an IP address band allocated to the data center 2 that the boundary router 30B belongs to is also set, and for the boundary router 30C, an IP address selected from an IP address band allocated to the data center 3 that the boundary router 30C belongs to is also set.

Figure 4:
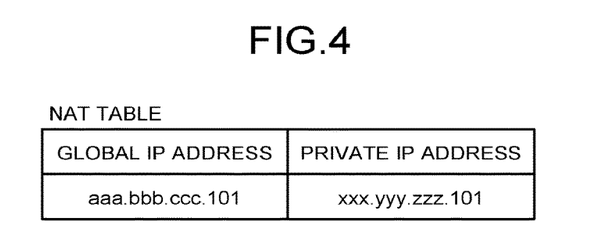
FIG. 4 is a diagram illustrating an example of a NAT table of the boundary router.

The boundary router 30 has a network address translation (NAT) function, and performs interconversion between a global IP address and a private IP address of each VM by use of a NAT table (see FIG. 4). For example, a case will be considered, where "xxx.yyy.zzz.0/24" is allocated as a private IP address space in the data center 1 and a private IP address of a VM(A) is "xxx.yyy.zzz.101". In this case, when the boundary router 30A receives a packet to the VM(A), the boundary router 30A converts a global IP address of a destination of the packet (for example, "aaa.bbb.ccc.101") to the private IP address of the VM(A) ("xxx.yyy.zzz.101") and transfers the packet to the VM(A) in the data center 1. The respective data centers are connected via the virtual Layer 2 (L2) network 21, and each of the boundary routers 30 is able to transfer a packet to a destination VM by using a NAT table when the packet is received.

Further, the boundary router 30 has a function as a so-called firewall (FW), and when the boundary router 30 detects an attack, such as a DDoS attack, the boundary router 30 performs filtering of the attack packets. Further, the boundary router 30 notifies the cloud controller 50 of the fact that the attack has been detected. This boundary router 30 may be realized by a physical machine, or may be realized by a virtual machine.

A VM executes communication with the user terminal 10 via the virtual L2 network 21 and the boundary router 30. This VM is, for example, a virtual machine that executes a Web server, a database (DB) server, or the like. This VM is realized by physical resources installed in the data center. The physical resources are a communication interface, a processor, a memory, a hard disk, and the like. Hereinafter, a case, where an attack on the VM(A) of the data center 1 has occurred and a host name of this VM(A) is "hoge.example.co.jp", will be described as an example.

Further, a redirecting device 70 is installed in the data center. When this redirecting device 70 receives access from the user terminal 10, the redirecting device 70 executes redirection to a predetermined redirection destination. In FIG. 1, the redirecting device 70 is illustrated as being installed in the data center 1, but the redirecting device 70 may be installed in the data center 2 or 3. This redirecting device 70 may be realized by a VM, or may be realized by a physical machine. Further, the redirecting device 70 may be realized by functions of the redirecting device 70 being implemented in the boundary router 30.

The boundary router 30, the VM, and the redirecting device 70 in each data center are connected to the virtual L2 network 21 via a virtual switch (illustration omitted). This virtual L2 network 21 is a logical L2 network that connects between the respective data centers. This virtual L2 network 21 may be realized by so-called virtualization technology, or may be realized by other technology.

The user terminals 10 access devices (for example, VMs) in the respective data centers via the network 60 and receive provision of various services from the VMs. Each of these user terminals 10 is, for example, a personal computer, a smartphone, or the like.

The DNS server 40 performs name resolution of host names. For example, when the DNS server 40 receives a request for name resolution of a host name of a VM of an access destination from the user terminal 10, the DNS server 40 returns an IP address corresponding to this host name. For example, the DNS server 40 refers to DNS information (see a reference sign 102) that the DNS server 40 has, and returns an IP address, "aaa.bbb.ccc.101", corresponding to "hoge.example.co.jp". The user terminal 10 then accesses the VM (for example, the VM(A)) by using the IP address.

In this DNS information, in addition to an IP address (global IP address) corresponding to a host name of each VM (for example, the VM(A)), an IP address corresponding to a host name of a redirection destination for when each VM (for example, the VM(A)) receives an attack is set.

Figure 1:
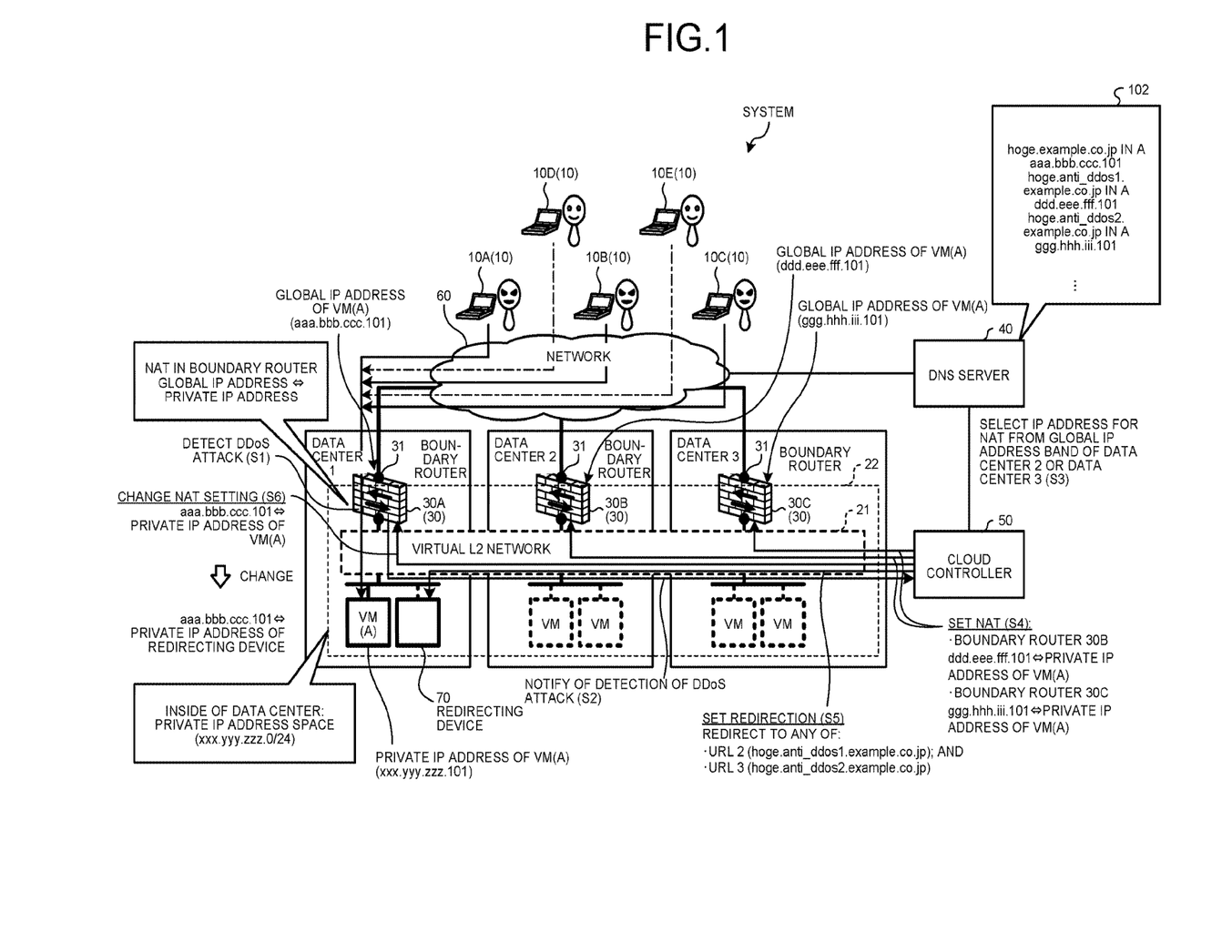
FIG. 1 is a diagram illustrating an example of an overall configuration of a system.

For example, in the DNS information illustrated with the reference sign 102 in FIG. 1, in addition to the IP address, "aaa.bbb.ccc.101", corresponding to the host name, "hoge.example.co.jp", of the VM(A), a host name of a redirection destination for when the VM(A) is attacked and an IP address corresponding to that host name are set. In a specific example, a case, where the redirection destination for when the VM(A) is attacked is the boundary router 30B of the data center 2 or the boundary router 30C of the data center 3, will be considered. In this case, in the DNS information illustrated with the reference sign 102 in FIG. 1, information is set, the information indicating that an IP address corresponding to a host name, "hoge.anti_ddos1.example.co.jp", is "ddd.eee.fff.101 (a global IP address of the VM(A) set in the boundary router 30B)", and an IP address corresponding to a host name, "hoge.anti ddos2.example.co.jp", is "ggg.hhh.iii.101 (a global IP address of the VM(A) set in the boundary router 30C)". Thereby, the user terminal 10 that has received redirection from the redirecting device 70 (details thereof described later) is able to perform name resolution of the host name of the redirection destination.

The cloud controller 50 performs control of the respective devices in the data center (for example, the boundary router 30, the VM, and the redirecting device 70). For example, the cloud controller 50 sets IP addresses for NAT for the other boundary routers 30 and changes setting of the NAT table. Further, the cloud controller 50 performs setting of redirection for the redirecting device 70.

(Outline of Operation)

Next, still by use of FIG. 1, an outline of operation in the above described system will be described. Herein, a case, where the boundary router 30A of the data center 1 has detected a DDoS attack on the VM(A), will be described as an example. For example, when the boundary router 30A of the data center 1 detects a DDoS attack (S1), the boundary router 30A notifies the cloud controller 50 of the detection of the DDoS attack (S2). The cloud controller 50 that has received this notification selects, from global IP address bands allocated respectively to the data centers 2 and 3, IP addresses for NAT (S3). The cloud controller 50 then performs setting of NAT in each boundary router 30 (S4). That is, the cloud controller 50 sets the global IP addresses selected in S3 and the private IP address of the VM(A), in the respective NAT tables of the boundary routers 30B and 30C.

For example, the cloud controller 50 sets the global IP address of the VM(A), "ddd.eee.fff.101", which has been selected in S3, and the private IP address of the VM(A), in the NAT table of the boundary router 30B. Further, the cloud controller 50 sets the global IP address of the VM(A), "ggg.hhh.iii.101", which has been selected in S3, and the private IP address of the VM(A), in the NAT table of the boundary router 30C.

Next, the cloud controller 50 then performs setting of redirection for the redirecting device 70 (S5). For example, the cloud controller 50 performs setting of redirection for the redirecting device 70, such that when the redirecting device 70 receives access from the user terminal 10, the redirecting device 70 performs redirection to any of a URL 2 (hoge.anti_ddos1_.example.co.jp) and a URL (hoge.anti_ddos2.example.co.jp). The URL 2 and the URL 3 are host names of redirection destinations for when the VM(A) is attacked, the host names written in the DNS information of the DNS server 40. The cloud controller 50 obtains these host names of the redirection destinations from, for example, the DNS information of the DNS server 40. If the data center 1 does not have therein the redirecting device 70, the cloud controller 50 generates (prepares) the redirecting device 70 by using resources in the data center and performs the above described setting of redirection. As a private IP address of the redirecting device 70, a vacant private IP address (for example, "xxx.yyy.zzz.102") from a predetermined private IP address space (for example, "xxx.yyy.zzz.0/24") is selected and allocated.

Thereafter, the cloud controller 50 changes the NAT setting of the boundary router 30A (S6). That is, the cloud controller 50 changes the private IP address corresponding to the global IP address of the VM(A) in the NAT table of the boundary router 30A from the private IP address of the VM(A) to the private IP address of the redirecting device 70 (for example, "xxx.yyy.zzz.102").

Figure 2:
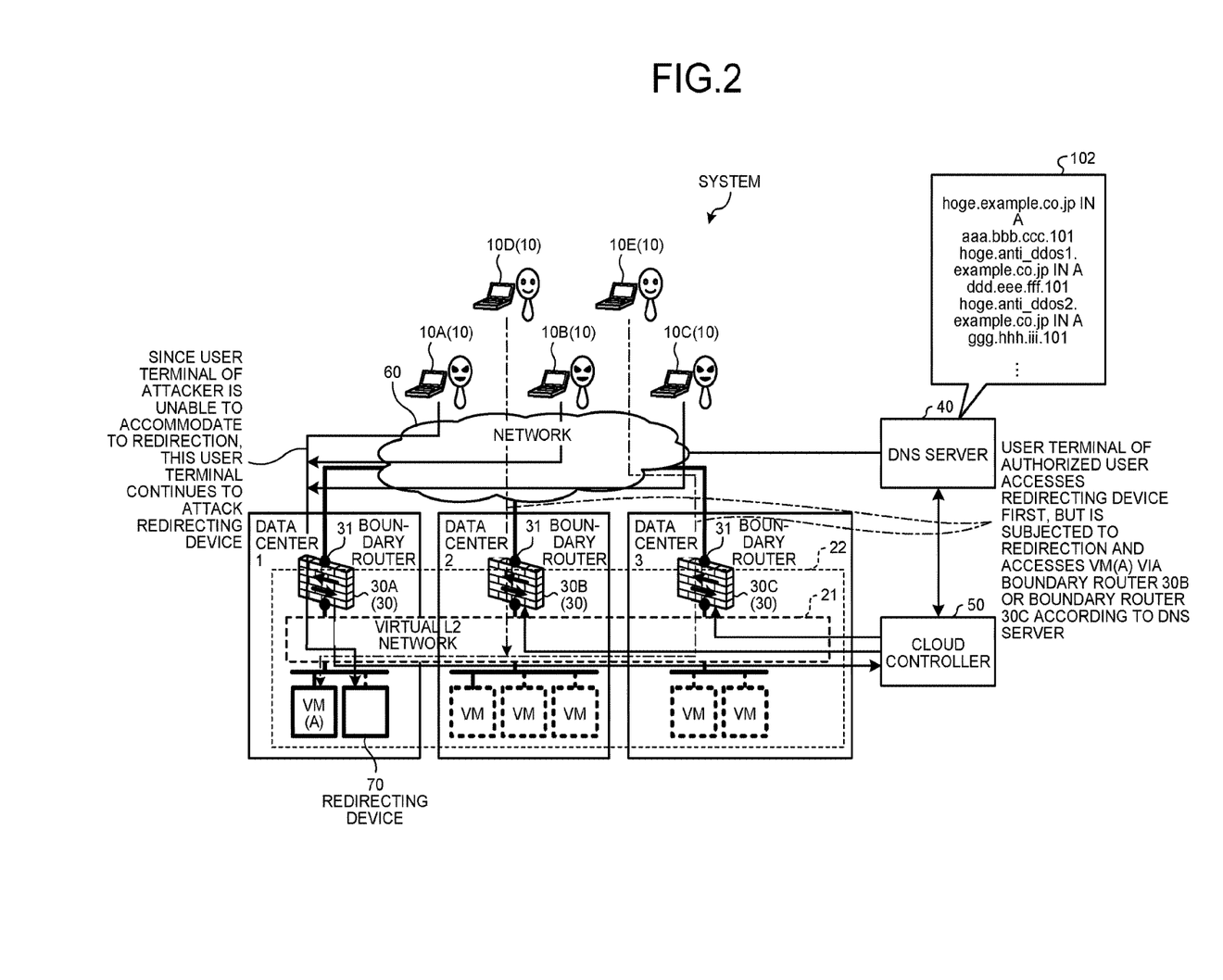
FIG. 2 is a diagram illustrating effects of the system.

Thereby, for example, as illustrated in FIG. 2, the user terminal 10 of an authorized user (for example, a user terminal 10D or 10E) firstly accesses the redirecting device 70, but is redirected, name resolution of the host name of the redirection destination is performed by the DNS server 40, and the user terminal 10 accesses the VM(A) via the boundary router 30B or the boundary router 30C. That is, the user terminal 10 of an authorized user (for example, the user terminal 10D or 10E) is redirected by the redirecting device 70 to either the URL 2 (hoge.anti_ddos1.example.co.jp) or the URL 3 (hoge.anti_ddos2.example.co.jp). When the user terminal 10 of an authorized user (for example, the user terminal 10D or 10E) is notified of the IP address ("ddd.eee.fff.101" or "ggg.hhh.iii.101") corresponding to the URL 2 (hoge.anti_ddos1.example.co.jp) or the URL 3 (hoge.anti_ddos2.example.co.jp) by the DNS server 40, this user terminal 10 accesses, based on this IP address, the VM(A) via the boundary router 30B or the boundary router 30C.

On the contrary, if the user terminal 10 of an attacker (for example, a user terminal 10A, 10B, or 10C) executes an attack with an attacking program (attacking tool) having no browser functions, since this user terminal 10 is unable to accommodate to redirection requiring browser functions, the user terminal 10 continues to attack the redirecting device 70 with the destination being the original IP address ("aaa.bbb.ccc.101") via the boundary router 30A.

Thereby, the user terminal 10 of an authorized user (for example, the user terminal 10D or 10E) will access the VM(A) by avoiding the boundary router 30A where access is being concentrated, and thus, even if an attack is caused, it will be easy for that user terminal 10 to access the VM(A). Further, since concentration of access to the boundary router 30A is mitigated, excessive use of the band of the boundary router 30A is able to be reduced. As a result, even if the system receives an attack, such as a DDoS attack, the system is able to continue to provide a service to the user terminal 10.

(Boundary Router)

Next, each component of the system will be described in detail. Firstly, by use of FIG. 3, the boundary routers 30 will be described.

Figure 3:
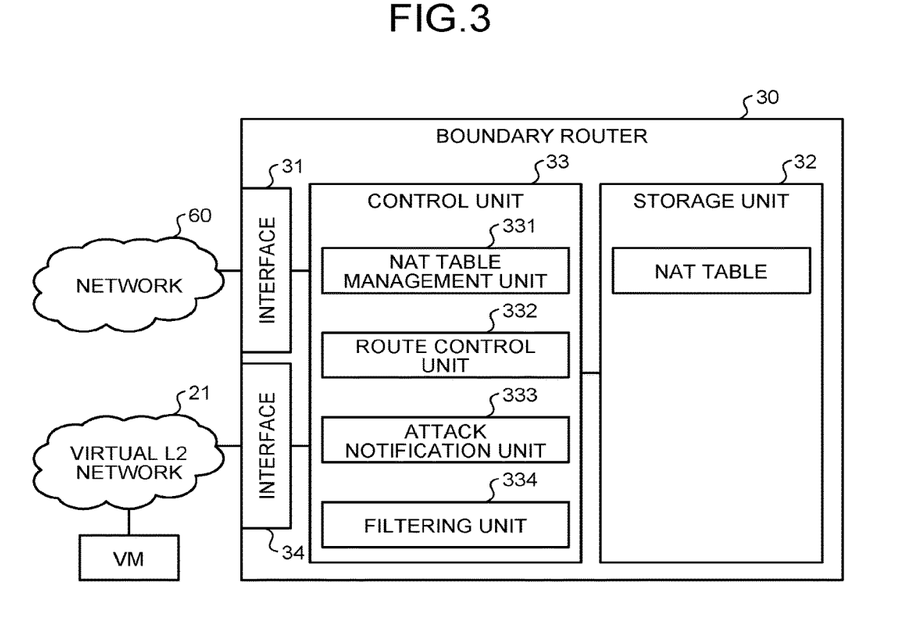
FIG. 3 is a diagram illustrating a configuration of a boundary router.

As described above, the boundary routers 30 are connected to the network 60, and relay communication between the user terminals 10 and the respective VMs of the respective data centers. Each of these boundary routers 30 includes interfaces 31 and 34, a storage unit 32, and a control unit 33.

The interface 31 is an interface that connects between the boundary router 30 and the network 60. For this interface 31, a global IP address, which is selected from an IP address band of the data center that this boundary router 30 belongs to, is set. The interface 34 is an interface that connects the boundary router 30 to the virtual L2 network 21 and the VM.

The storage unit 32 stores therein the NAT table. The NAT table is information associating between a global IP address and a private IP address, of a device (for example, the VM) in the data center. For example, the NAT table illustrated in FIG. 4 is the NAT table in the boundary router 30A, and this NAT table indicates that the private IP address corresponding to the global IP address, "aaa.bbb.ccc.101", is "xxx.yyy.zzz.101". This NAT table is referred to when a route control unit 332 (described later) performs NAT. Further, this NAT table is changed based on an instruction from the cloud controller 50.

The control unit 33 in FIG. 3 includes a NAT table management unit 331, the route control unit 332, an attack notification unit 333, and a filtering unit 334.

The NAT table management unit 331 updates the NAT table (see FIG. 4), based on an instruction from an external device. For example, if there has been an instruction from the cloud controller 50 to change the setting of the private IP address in the NAT table, the private IP address corresponding to the global IP address of the VM(A); in response to this instruction, the setting in the NAT table is changed.

Figure 5:
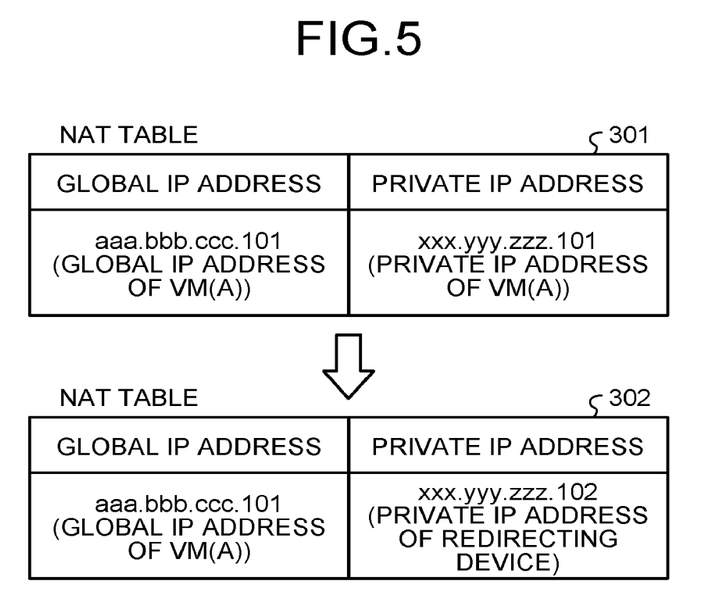
FIG. 5 is a diagram illustrating an example of change of a setting in the NAT table of the boundary router.

For example, if there has been an instruction from the cloud controller 50 to change the setting of the private IP address in the NAT table, the private IP address corresponding to the global IP address of the VM(A), "aaa.bbb.ccc.101", from "xxx.yyy.zzz.101 (the private IP address of the VM(A))" to "xxx.yyy.zzz.102 (the private IP address of the redirecting device 70)", in response to this instruction, the NAT table management unit 331 changes the setting in the NAT table as illustrated with a reference sign 301 to a reference sign 302 in FIG. 5.

The route control unit 332 in FIG. 3 performs route control for a packet input via the interface 31 or 34. For example, if the route control unit 332 receives a packet to a VM from the user terminal 10 via the interface 31, the route control unit 332 transfers this packet to that VM. Upon this transfer, the route control unit 332 refers to the NAT table (see FIG. 4) and performs NAT conversion between the global IP address appended to the packet and the private IP address.

If the attack notification unit 333 detects an attack, such as a DDoS attack, on a VM via its boundary router 30, the attack notification unit 333 notifies the cloud controller 50 of the fact that the attack has been detected.

The filtering unit 334 performs filtering of attack packets. For example, the filtering unit 334 refers to header information of a received packet, and discards any packet presumed to be an attack packet.

Although this boundary router 30 has been described as being realized by a router including the so-called FW function, the boundary router 30 may, of course, be realized by two devices, a router and a FW.

(DNS Server)

Figure 6:
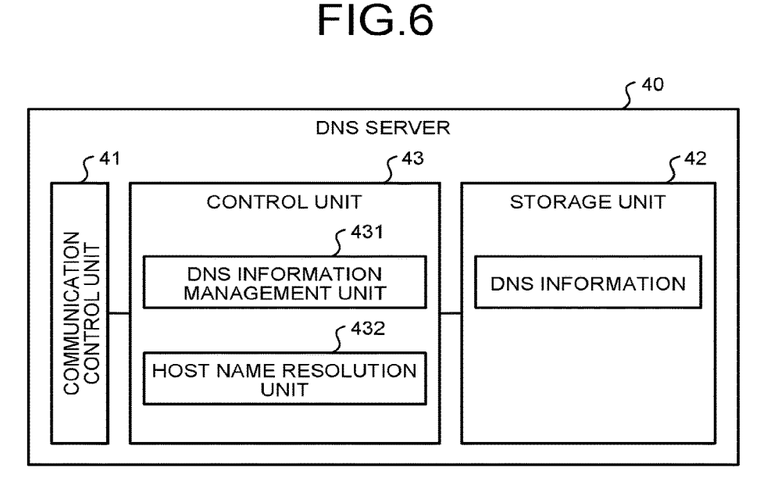
FIG. 6 is a diagram illustrating a configuration of a DNS server.

Next, by use of FIG. 6, the DNS server 40 will be described. The DNS server 40 performs, as described above, name resolution of a host name of an access destination. This DNS server 40 includes a communication control unit 41, a storage unit 42, and a control unit 43.

The communication control unit 41 controls communication with another device. For example, the communication control unit 41 controls communication performed with the user terminal 10 or the like.

The storage unit 42 stores therein the DNS information. This DNS information includes information on IP addresses (global IP addresses) corresponding to host names. This DNS information is referred to when a host name resolution unit 432 (described later) performs name resolution of a host name. This DNS information is, for example, the information illustrated with the reference sign 102 in FIG. 1, or the like.

The control unit 43 includes a DNS information management unit 431 and the host name resolution unit 432.

The DNS information management unit 431 sets, based on an instruction from an external device (for example, the cloud controller 50), the DNS information. For example, as illustrated with the reference sign 102 in FIG. 1: as the IP address corresponding to the host name of the VM(A), "hoge.example.co.jp", "aaa.bbb.ccc.101" is set; as the IP address, " ddd.eee.fff.101", corresponding to the host name, "hoge.anti_ddos1.example.co.jp" is set; and as the IP address corresponding to the host name, "hoge.anti_ddos2.example.co.jp", "ggg.hhh.iii.101" is set. That is, in this DNS information, in addition to a pair of a host name and an IP address of a VM, a pair of a host name and an IP address of a VM used when an attack on that VM is detected, is set. As this IP address corresponding to the host name of the VM used when an attack on the VM is detected, an IP address under the boundary router 30 of a location other than the location that the victim VM belongs to is used. The host name of the VM used when an attack on the VM is detected is referred to when a redirection setting unit 533 (described later) sets redirection for the redirecting device 70. Further, "anti_ddos1" and "anti_ddos2" included in the above mentioned host names are character strings used in order to simplify the explanation, but character strings that will be recognized by attackers to be countermeasures against DDoS are not used.

The host name resolution unit 432 refers to the DNS information to perform name resolution of a host name. For example, when the host name resolution unit 432 receives a request for name resolution of a host name of the VM(A) from the user terminal 10, the host name resolution unit 432 refers to the DNS information and returns an IP address corresponding to that host name.

(Cloud Controller)

Figure 7:
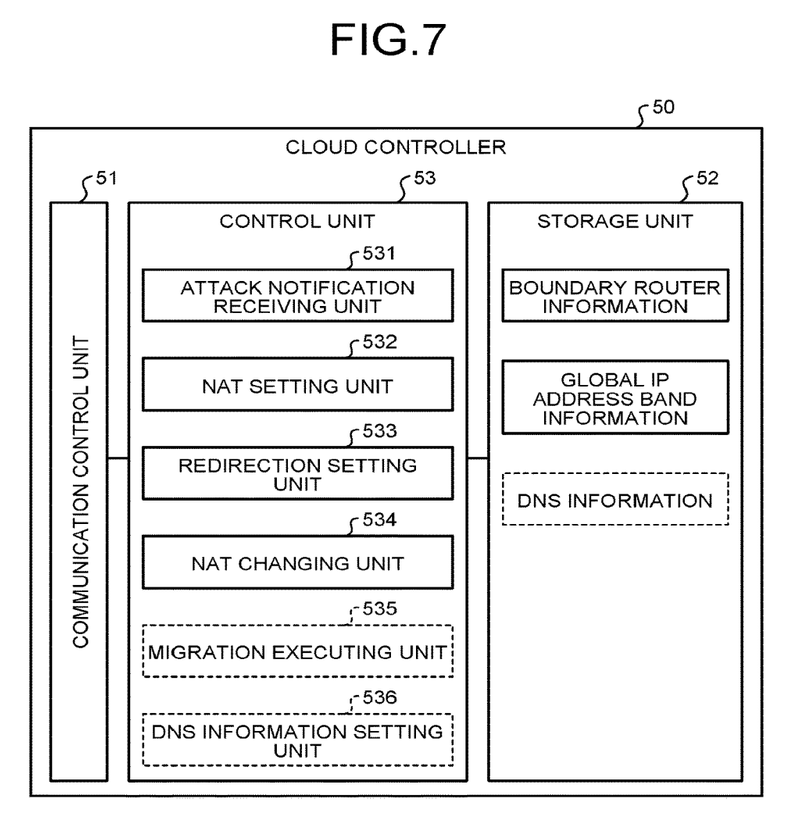
FIG. 7 is a diagram illustrating a configuration of a cloud controller.

Next, by use of FIG. 7, the cloud controller 50 will be described. The cloud controller 50 performs, as described above, control of each device in the data centers (for example, the boundary router 30, the VM, the redirecting device 70, or the like).

The cloud controller 50 includes a communication control unit 51, a storage unit 52, and a control unit 53. The communication control unit 51 controls communication with another device. For example, the communication control unit 51 controls communication performed with the boundary router 30 or the DNS server 40.

The storage unit 52 stores therein boundary router information and global IP address band information.

The boundary router information is information indicating, for each boundary router 30, a data center that the boundary router 30 belongs to, and an IP address of that boundary router 30.

Figure 8:
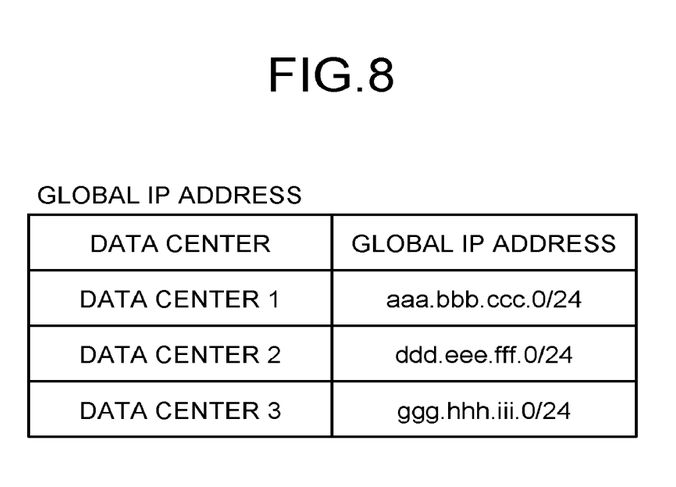
FIG. 8 is a diagram illustrating an example of global IP address band information.

The global IP address band information is information indicating a global IP address band allocated to each of the data centers. For example, the global IP address band information illustrated in FIG. 8 indicates that the global IP address band allocated to the data center 1 is "aaa.bbb.ccc.0/ 24", and the global IP address band allocated to the data center 2 is "ddd.eee.fff.0/24". This global IP address band information is referred to when a NAT setting unit 532 (described later) performs setting of NAT for each boundary router 30.

The control unit 53 includes an attack notification receiving unit 531, the NAT setting unit 532, the redirection setting unit 533, and a NAT changing unit 534. A migration executing unit 535 and a DNS information setting unit 536 illustrated with broken lines may be included or may not be included, and a case where they are included will be described later.

The attack notification receiving unit 531 receives attack notification from the boundary router 30.

The NAT setting unit 532 performs setting of NAT of the victim VM for the boundary router 30 of each data center when the attack notification is received by the attack notification receiving unit 531.

For example, a case where the victim VM is the VM(A) of the data center 1 will be considered. In this case, the NAT setting unit 532 refers to the global IP address band information (see FIG. 8) for each boundary router 30 of the data centers 2 and 3, and selects IP addresses for NAT of the VM(A). For example, the NAT setting unit 532 refers to the global IP address band information (see FIG. 8); and selects "ddd.eee.fff.101" from the global IP address band, "ddd.eee.fff.0/24", which is allocated to the data center 2, and selects "ggg.hhh.iii.101" from the global IP address band, "ggg.hhh.iii.0/24", which is allocated to the data center 3. The NAT setting unit 532 then performs setting of NAT associating "ddd.eee.fff.101" with the private IP address of the VM (for example, "xxx.yyy.zzz.101"), for the boundary router 30B of the data center 2. Further, the NAT setting unit 532 performs setting of NAT associating "ggg.hhh.iii.101" with the private IP address of the VM (for example, "xxx.yyy.zzz.101"), for the boundary router 30C of the data center 3. The NAT setting unit 532 stores the IP address of each VM that has been set for NAT in the storage unit 52 such that there is no overlap of IP addresses between the respective VMs in setting NAT.

The redirection setting unit 533 performs setting of redirection for the redirecting device 70, when attack notification is received by the attack notification receiving unit 531.

For example, if the victim VM is the VM(A) of the data center 1, the redirection setting unit 533 obtains, from the DNS information of the DNS server 40 (see the reference sign 102 in FIG. 1), the host names of the VMs to be used when an attack on this VM(A) is detected ("hoge.anti_ddos1.example.co.jp" and "hoge.anti_ddos2.example.co.jp"), and performs, for the redirecting device 70, setting of redirection to a host of any of the obtained host names. Thereby, access to the redirecting device 70 from the user terminal 10 (the user terminal 10 of an authorized user) is redirected to either "hoge.anti_ddos1.example.co.jp" or "hoge.anti_ddos2.example.co.jp". As a result, the user terminal 10 (the user terminal 10 of the authorized user) will access the VM(A) via the boundary router 30B or the boundary router 30C. When the redirection setting unit 533 sets plural redirection destinations for the redirecting device 70, the redirection setting unit 533 may also set a method for the redirecting device 70 to select a redirection destination (for example, by a round robin, or the like).

If the redirecting device 70 is not available in the data center that the victim VM belongs to, the redirection setting unit 533 generates the redirecting device 70 (for example, a VM for redirection), for example, in the data center that the victim VM belongs to, and performs the above described setting of redirection for the generated redirecting device 70. Since the respective data centers are connected via the virtual L2 network 21, the redirection setting unit 533 may generate the redirecting device 70 in a data center other than the data center that the victim VM belongs to, but by generating the redirecting device 70 in the data center that the victim VM belongs to, attack packets are prevented from being communicated across the data centers.

After redirection has been set by the redirection setting unit 533, the NAT changing unit 534 changes the private IP address of the victim VM in the NAT table of the boundary router 30 of the data center that the victim VM belongs to, to the private IP address of the redirecting device 70.

For example, if the victim VM is the VM(A) of the data center 1, the NAT changing unit 534 changes the private IP address of the VM(A) in the NAT table of the boundary router 30A of the data center 1 that the VM(A) belongs to, to the private IP address of the redirecting device 70 (see S6 in FIG. 1). Thereby, traffic destined for the VM(A) via the boundary router 30A will reach the redirecting device 70.

(Redirecting Device)

Figure 9:
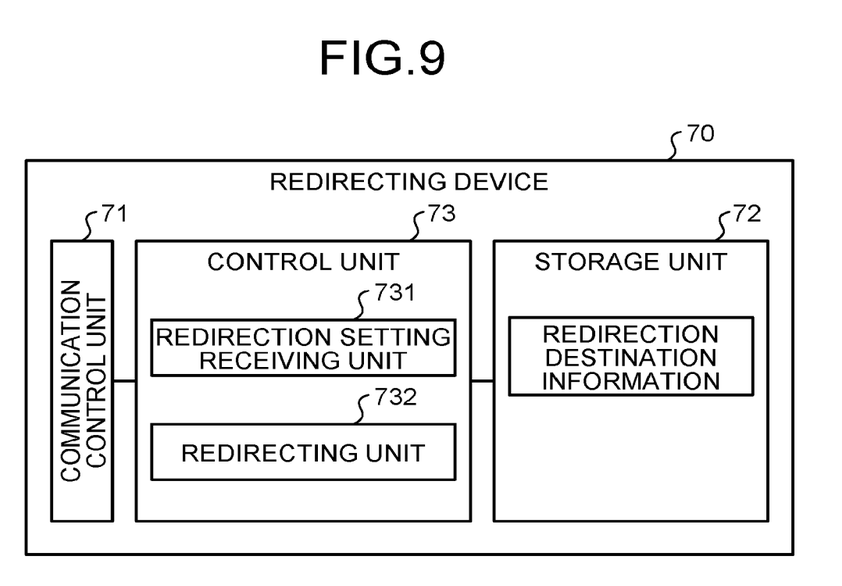
FIG. 9 is a diagram illustrating a configuration of a redirecting device.

Next, by use of FIG. 9, the redirecting device 70 will be described. As described above, the redirecting device 70 performs redirection of access from the user terminal 10. This redirecting device 70 includes a communication control unit 71, a storage unit 72, and a control unit 73.

The communication control unit 71 controls communication with another device. For example, the communication control unit 71 controls communication performed with the cloud controller 50 or the user terminal 10.

The storage unit 72 stores therein redirection destination information. This redirection destination information is information indicating host names of redirection destinations of the redirecting device 70, and for example, "hoge.anti_ddos1.example.co.jp", "hoge.anti_ddos2.example.co.jp", and the like are written therein.

The control unit 73 includes a redirection setting receiving unit 731 and a redirecting unit 732.

When the redirection setting receiving unit 731 receives a redirection setting from the cloud controller 50 via the communication control unit 71, the redirection setting receiving unit 731 outputs redirection destination information (host names of redirection destinations) included in the redirection setting to the storage unit 72.

The redirecting unit 732 performs HTTP redirection (redirection) of access from the user terminal 10. For example, when the redirecting unit 732 receives access from the user terminal 10 via the communication control unit 71, the redirecting unit 732 performs redirection to a host name determined by a round robin from the host names indicated in the redirection destination information (for example, "hoge.anti_ddos1.example.co.jp" and "hoge.anti_ddos2.example.co.jp"). By the redirecting unit 732 determining the redirection destination by a round robin as described above, traffic to the victim VM (for example, VM(A)) from the user terminal 10 of an authorized user is distributed among the boundary routers 30 of the respective data centers.

(Procedure)

Figure 10:
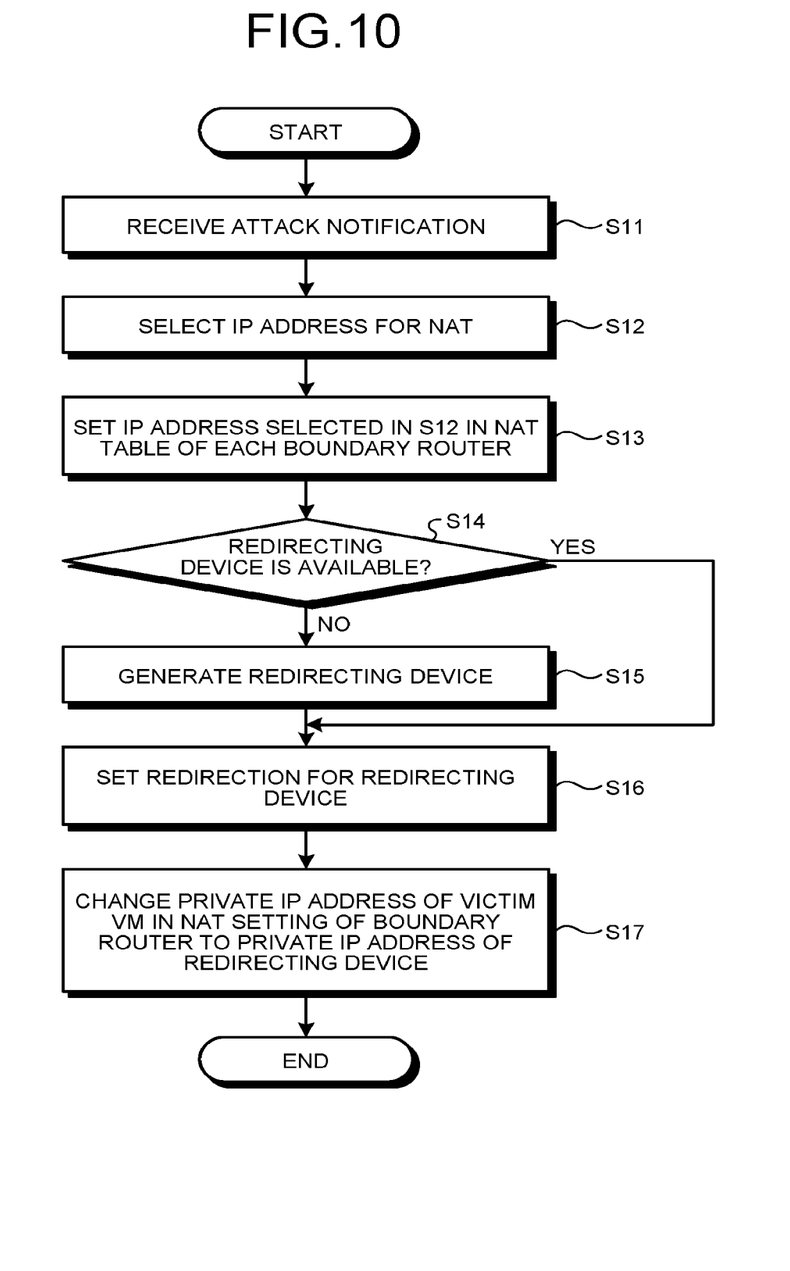
FIG. 10 is a flow chart illustrating a procedure of the cloud controller.

Next, by use of FIG. 10, a procedure of the cloud controller 50 will be described. When the attack notification receiving unit 531 of the cloud controller 50 receives, from the boundary router 30, notification of an attack on a VM (S11), the NAT setting unit 532 refers to the global IP address band information (see FIG. 7) and selects IP addresses for NAT of that VM (S12). The NAT setting unit 532 then sets the IP addresses selected in S12 in the NAT tables of the respective boundary routers 30 (the boundary routers 30 of the respective data centers other than the data center that the victim VM belongs to) (S13). Thereafter, the redirection setting unit 533 checks whether or not the data center that the victim VM belongs to has the redirecting device 70 (S14), and if the data center does not have the redirecting device 70 (S14; No), the redirection setting unit 533 generates the redirecting device 70 (S15). The redirection setting unit 533 then proceeds to S16. On the contrary, if the data center that the victim VM belongs to has the redirecting device 70 (514; Yes), the redirection setting unit 533 skips S15 and proceeds to S16.

At S16, the redirection setting unit 533 performs setting of redirection for the redirecting device 70. The redirection setting unit 533 obtains, from the DNS information of the DNS server 40 (see the reference sign 102 in FIG. 1), for example, host names of VMs to be used when an attack on the VM(A) is detected ("hoge.anti_ddos1.example.co.jp" and "hoge.anti_ddos2.example.co.jp"), and performs, for the redirecting device 70, setting of redirection to a host having any of the obtained host names.

After S16, the NAT changing unit 534 changes the private IP address of the victim VM in the NAT setting of the boundary router 30 of the data center that the victim VM belongs to, to the private IP address of the redirecting device 70 (S17).

Figure 11:
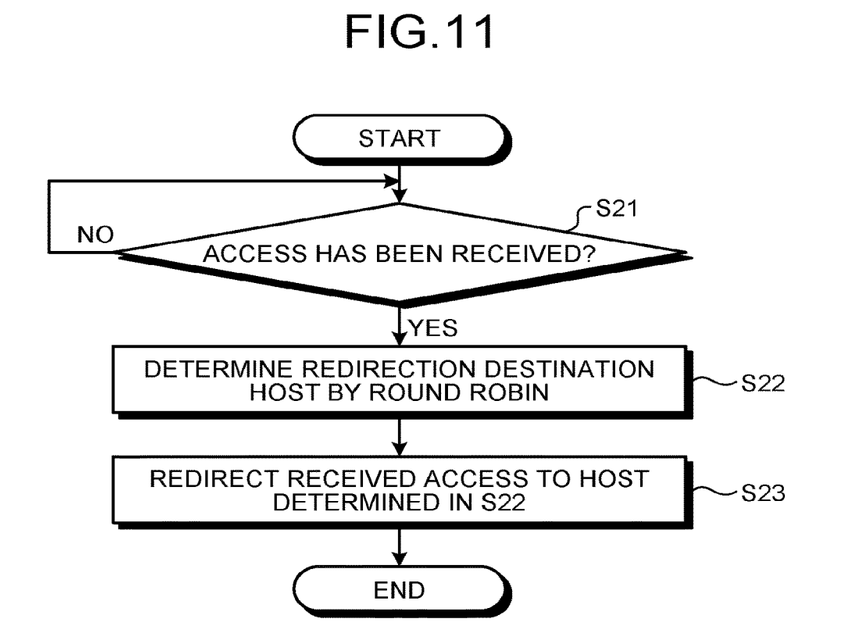
FIG. 11 is a flow chart illustrating a procedure of the redirecting device.

Next, by use of FIG. 11, a procedure of the redirecting device 70 will be described. When the redirecting unit 732 of the redirecting device 70 receives access from the user terminal 10 (S21; Yes), the redirecting unit 732 determines a redirection destination host from the hosts indicated in the redirection destination information by a round robin (S22), and redirects access from the user terminal 10 to the host determined in S22 (S23). Before the redirecting unit 732 receives access from the user terminal 10 (S21; No), the processing is returned to S21.

(Effects)

By the system executing the above described processing, access to a victim VM from the user terminal 10 of an authorized user is redirected by the redirecting device 70. When name resolution of a host name of the redirection destination is performed by the DNS server 40, the user terminal 10 of the authorized user will then access the victim VM via the boundary router 30 of a data center other than the data center that the victim VM belongs to. On the contrary, since the user terminal 10 of an attacker is unable to accommodate to the redirection even if the user terminal 10 of the attacker accesses the redirecting device 70, the user terminal 10 of the attacker will be kept in a state of having accessed the redirecting device 70.

That is, since the user terminal 10 of the authorized user accesses the victim VM by avoiding the boundary router 30 where access is concentrated due to the attack, it becomes easier for the user terminal 10 of the authorized user to access the victim VM. Further, since concentration of access at the boundary router 30 of the data center that the victim VM belongs to is mitigated by the redirection, excessive use of the band of the boundary router 30 is able to be reduced. As a result, even if the system receives an attack, such as a DDoS attack, the system is able to continue to provide a service to the user terminal 10.

Figure 12:
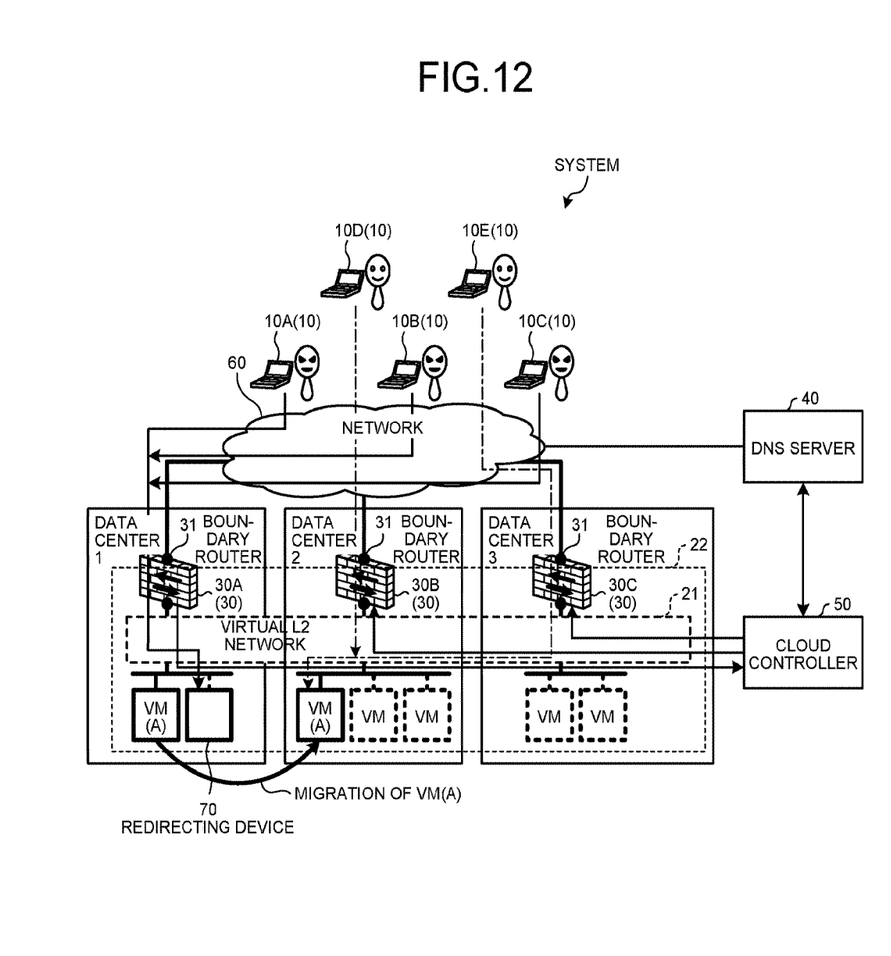
FIG. 12 is a diagram illustrating migration of a VM.

With reference to FIG. 12, effects of this embodiment will be described in detail by use of a specific example. Herein, as an example, a case will be considered, where a bandwidth of an access line connecting between the respective data centers and the network 60 is 10 Gbps, a total of attack traffic from the user terminals 10 (10A, 10B, and 10C) of attackers is 8 Gbps, a total of traffic from the user terminals 10 (10D and 10E) of authorized users is 4 Gbps, and a VM replies data of 2 Mbytes in response to one request.

In this case, a load on the access line of the data center 1 is 8 Gbps+4 =12 Gbps. Since the bandwidth of the access line connecting between the data center 1 and the network 60 is 10 Gbps; as is, traffic worth 2 Gbps including the traffic from the user terminals 10 of the authorized users will be discarded.

By the system implementing redirection with the redirecting device 70, the following effects are able to be expected.

That is, the traffic from the user terminals 10 (10D and 10E) of the authorized users is distributed between the boundary routers 30 of two data centers (data centers 2 and 3). As a result, traffic to the boundary router 30A of the data center 1 will be 8 Gbps, traffic to the boundary router 30B of the data center 2 will be 2 Gbps, and traffic to the boundary router 30C of the data center 3 will be 2 Gbps. That is, since the traffic will become not greater than 10 Gbps, the traffic will not be discarded, and the traffic from the user terminals 10 of the authorized users will be kept.

Further, since the redirecting device 70 transmits redirection information to the user terminals 10, in contrast to a case where a VM or the like replies data (in the above described example, 2 Mbytes) to the user terminals 10, the amount of traffic to the user terminals 10 is able to be reduced. Furthermore, since the main processing of the redirecting device 70 is the redirection processing, for access from the user terminals 10 and the like, the redirecting device 70 requires less resources, such as a central processing unit (CPU) and a memory, than a normal Web server. As a result, the redirecting device 70 is able to accommodate to access from multiple user terminals 10. Moreover, the redirecting device 70 is effective for DDoS attacks carried out on resources of VMs.

In addition, due to the change of the NAT setting in the boundary router 30 and the redirection by the redirecting device 70, access from the user terminals 10 of the attackers does not reach the victim VM. Therefore, the victim VM just needs to handle access from the user terminals 10 of the authorized users, and thus is able to deal with a DDoS attack carried out on resources of the VM as described above.

What is more, the system performs setting of the DNS information in the DNS server 40 before an attack is detected. Therefore, in contrast to, for example, a case where a countermeasure is implemented by change of DNS information of a DNS server after an attack is detected like the technique described in Non-Patent Literature 7, the system is able to implement the countermeasure against the attack promptly.

(Other Embodiments)

After performing setting of redirection by use of the redirecting device 70 as described above, the cloud controller 50 may migrate the victim VM to another data center (for example, the data center 2). In this case, the cloud controller 50 includes the migration executing unit 535 illustrated in FIG. 7, and migration of that VM is executed by this migration executing unit 535.

For example, the migration executing unit 535 of the cloud controller 50 migrates, as illustrated in FIG. 12, the victim VM(A) from the data center 1 to the data center 2. By execution of such migration, the user terminal 10 of an authorized user that has accessed the VM(A) via the boundary router 30B or the boundary router 30C no longer needs to perform communication with the data center 1, and thus the communication time with the VM(A) is able to be shortened.

Further, the case where a single boundary router 30 is installed in each data center has been described as an example, but plural boundary routers 30 may, of course, be installed in each data center. In this case, by a procedure similar to that described above, the cloud controller 50 causes redirection to be executed by the redirecting device 70, the redirection including performing setting of NAT in each boundary router 30, and changing NAT of the boundary routers 30 of the data center that the victim VM belongs to.

It has been described above that the boundary router 30 transmits the attack notification when the boundary router 30 has detected a DDoS attack, but limitation is not made thereto. For example, attack notification may be transmitted when packets to a VM have been transmitted, the packets relayed by the boundary router 30 and exceeding a predetermined threshold. As this threshold, for example, a value of a bandwidth set in the interface 31 connecting between the boundary router 30 and the network 60 is used.

Further, it has been described above that the redirection setting unit 533 of the cloud controller 50 obtains, from the DNS information of the DNS server 40, a host name of a redirection destination set for the redirecting device 70, but limitation is not made thereto. For example, if the cloud controller 50 sets the DNS information of the DNS server 40, the cloud controller 50 stores the DNS information set for the DNS server 40 in the storage unit 52. The cloud controller 50 then obtains a host name of a redirection destination from the DNS information of the storage unit 52 and sets the obtained host name for the redirecting device 70. That is, the cloud controller 50 further includes the DNS information setting unit 536 (see FIG. 7) that sets the DNS information of the DNS server 40, and the DNS information setting unit 536 stores the DNS information set for the DNS server 40 in the storage unit 52. The redirection setting unit 533 obtains a host name of a host under the boundary router 30 of any location other than the location that the victim VM belongs to, from the DNS information of the storage unit 42, and sets the host having that host name as the host of the redirecting device 70.

Each component of the above described system is functionally conceptual, is not necessarily configured as illustrated in the respective drawings, and may be configured by being integrated or distributed in arbitrary units.

(Program)

Further, a program may be generated and executed, the program describing therein the above described processing executed by the cloud controller 50 according to the embodiment in a language executable by a computer. In this case, by the computer executing the program, effects that are the same as those of the above described embodiment are able to be obtained. Further, by recording this program in a computer readable recording medium and causing the computer to load and execute the program recorded in this recording medium, processing that is the same as that of the above described embodiment may be realized. Hereinafter, an example of a computer, which executes a control program that realizes functions that are the same as those of the cloud controller 50, will be described.

Figure 13:
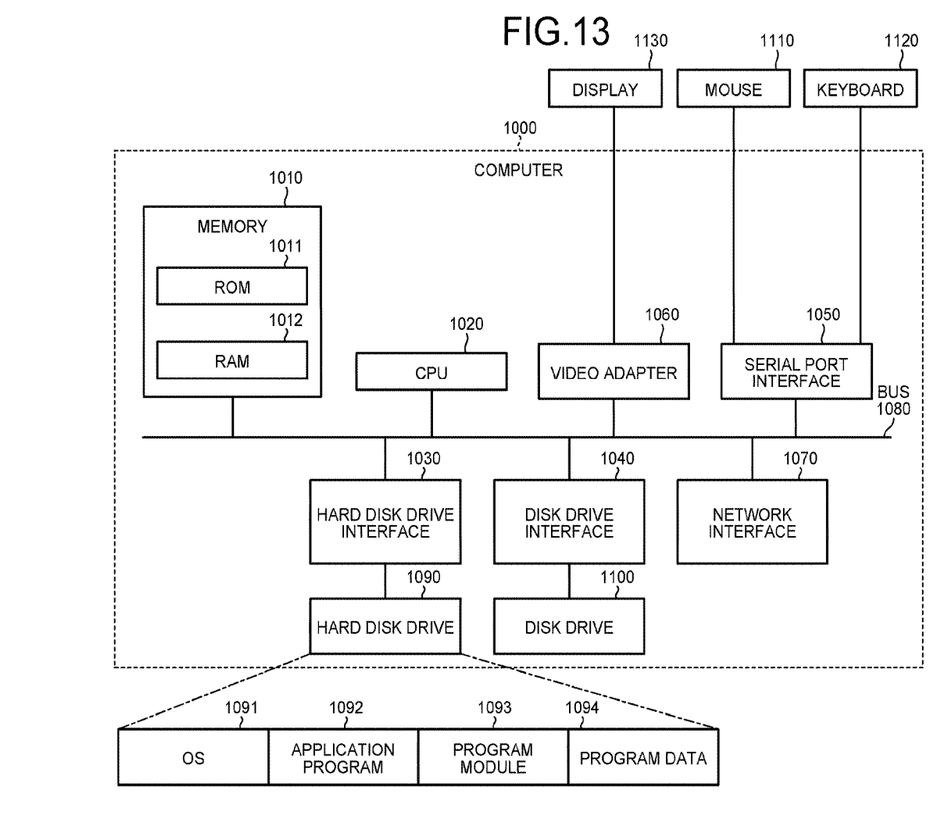
FIG. 13 is a diagram illustrating a computer that executes a control program.

FIG. 13 is a diagram illustrating the computer that executes the control program. As illustrated in FIG. 13, a computer 1000 has, for example, a memory 1010, a CPU 1020, a hard disk drive interface 1030, a disk drive interface 1040, a serial port interface 1050, a video adapter 1060, and a network interface 1070. These units are connected to one another via a bus 1080.

The memory 1010 includes a read only memory (ROM) 1011 and a random access memory (RAM) 1012. The ROM 1011 stores therein a boot program, such as Basic Input Output System (BIOS), for example. The hard disk drive interface 1030 is connected to a hard disk drive 1090. The disk drive interface 1040 is connected to a disk drive 1100. An attachable and detachable storage medium, such as a magnetic disk or an optical disk, for example, is inserted in the disk drive 1100. A mouse 1110 and a keyboard 1120, for example, are connected to the serial port interface 1050. A display 1130, for example, is connected to the video adapter 1060.

As illustrated in FIG. 13, the hard disk drive 1090 stores therein, for example, an OS 1091, an application program 1092, a program module 1093, and program data 1094. Each table described in the above embodiment is stored in, for example, the hard disk drive 1090 or the memory 1010.

Further, the control program is stored, as a program module, in which commands executed by the computer 1000 are described, for example, in the hard disk drive 1090. Specifically, a program module, in which the processing executed by the cloud controller 50 described in the embodiment above is described, is stored in the hard disk drive 1090.

Further, data used in information processing by the control program are stored as program data in, for example, the hard disk drive 1090. The CPU 1020 loads the program module 1093 and the program data 1094 stored in the hard disk drive 1090 as necessary into the RAM 1012 and executes the above described procedures.

The program module 1093 and the program data 1094 related to the control program are not necessarily stored in the hard disk drive 1090, and for example, may be stored in an attachable and detachable storage medium and read out by the CPU 1020 via the disk drive 1100 or the like. Or, the program module 1093 and the program data 1094 related to the control program may be stored in another computer connected via a network, such as a local area network (LAN) or a wide area network (WAN), and read out by the CPU 1020 via the network interface 1070.

REFERENCE SIGNS LIST

1, 2, 3 DATA CENTER
10 USER TERMINAL
21 VIRTUAL L2 NETWORK
22 NETWORK SEGMENT
30 BOUNDARY ROUTER
31, 34 INTERFACE
32, 42, 52, 72 STORAGE UNIT
33, 43, 53, 73 CONTROL UNIT
40 DNS SERVER
41, 51, 71 COMMUNICATION CONTROL UNIT
50 CLOUD CONTROLLER
60 NETWORK
331 NAT TABLE MANAGEMENT UNIT
332 ROUTE CONTROL UNIT
333 ATTACK NOTIFICATION UNIT
334 FILTERING UNIT
431 DNS INFORMATION MANAGEMENT UNIT
432 HOST NAME RESOLUTION UNIT
531 ATTACK NOTIFICATION RECEIVING UNIT
532 NAT SETTING UNIT
533 REDIRECTION SETTING UNIT
534 NAT CHANGING UNIT
535 MIGRATION EXECUTING UNIT
536 DNS INFORMATION SETTING UNIT
731 REDIRECTION SETTING RECEIVING UNIT
732 REDIRECTING UNIT

The invention claimed is:

1. A control device that performs control for boundary routers, which are installed in plural locations mutually connected via a virtual network and which relay communication between devices in the locations and an external network, the control device comprising:
   a NAT setting unit that performs, for a boundary router of each location other than a location that a victim device belongs to, when concentration of packets at a device in any of the locations is detected, setting of network address translation (NAT) of an IP address of the victim device, the victim device being a device where the concentration of packets has been detected;
   a redirection setting unit that performs setting for a redirecting device installed in any of the locations, such that the redirecting device redirects access to the redirecting device, to a host under a boundary router of any of the locations other than the location that the victim device belongs to; and
   a NAT changing unit that changes, after the redirection has been set, a private IP address of the victim device in a NAT setting of a boundary router of the location that the victim device belongs to, to a private IP address of the redirecting device.

2. The control device according to claim 1, wherein
   the redirection setting unit: obtains a host name of the host under the boundary router of any of the locations other than the location that the victim device belongs to, from a Domain Name System (DNS) server having DNS information having, set therein, a host name of the device and an IP address corresponding to the host name, and a host name of a host under a boundary router of a location other than the location that the device belongs to and an IP address corresponding to the host name; and performs setting for the redirecting device such that the redirecting device redirects the access to the redirecting device, to the host having that host name.

3. The control device according to claim 1, further comprising:
a storage unit that stores therein Domain Name System (DNS) information set in a DNS server, the DNS information including: a host name of the device and an IP address corresponding to the host name; and a host name of a host under a boundary router of a location other than the location that the device belongs to and an IP address corresponding to the host name, wherein
the redirection setting unit obtains a host name of the host under the boundary router of any of the locations other than the location that the victim device belongs to, from the DNS information, and performs setting for the redirecting device, such that the redirecting device redirects the access to the redirecting device, to the host having that host name.

4. The control device according to claim 1, wherein when the redirecting device is not available, the redirection setting unit generates the redirecting device in a location, or performs setting such that a device in a location is caused to operate as the redirecting device.

5. The control device according to claim 1, further comprising a migration executing unit that migrates the victim device to another location, after the NAT changing unit changes the private IP address of the victim device in the NAT setting of the boundary router of the location that the victim device belongs to, to the private IP address of the redirecting device.

6. The control device according to claim 1, wherein the detection of the concentration of packets at the device in any of the locations is any of: when a DDoS attack on the device has been detected in the boundary router of the location; and when reception of packets of a traffic amount exceeding a bandwidth set in an external network side interface of the boundary router has been detected.

7. A control system comprising a control device that performs control for boundary routers, which are installed in plural locations mutually connected via a virtual network and which relay communication between devices in the locations and an external network, the control system including:
a redirecting device that redirects access from another device, wherein
the control device comprises:
a NAT setting unit that performs, for a boundary router of each location other than a location that a victim device belongs to, when concentration of packets at a device in any of the locations is detected, setting of network address translation (NAT) of an IP address of the victim device, the victim device being a device where the concentration of packets has been detected;
a redirection setting unit that performs setting for the redirecting device, such that the redirecting device redirects access to the redirecting device, to a host under a boundary router of any of the locations other than the location that the victim device belongs to; and
a NAT changing unit that changes, after the redirection has been set, a private IP address of the victim device in a NAT setting of a boundary router of the location that the victim device belongs to, to a private IP address of the redirecting device.

8. A control system according to claim 7, further comprising:
a DNS server that has Domain Name System (DNS) information having, set therein: a host name of the device and an IP address corresponding to the host name; and a host name of a host under a boundary router of a location other than the location that the device belongs to and an IP address corresponding to the host name, wherein
the redirection setting unit obtains a host name of the host under the boundary router of any of the locations other than the location that the victim device belongs to, from the DNS server, and performs setting for the redirecting device, such that the redirecting device redirects the access to the redirecting device, to the host having that host name.

9. A control method of performing control for boundary routers, which are installed in plural locations mutually connected via a virtual network and which relay communication between devices in the locations and an external network, the control method including:
a step of performing, for a boundary router of each location other than a location that a victim device belongs to, when concentration of packets at a device in any of the locations is detected, setting of network address translation (NAT) of an IP address of the victim device, the victim device being a device where the concentration of packets has been detected;
a step of performing setting for a redirecting device installed in any of the locations, such that the redirecting device redirects access to the redirecting device, to a host under a boundary router of any of the locations other than the location that the victim device belongs to; and
a step of changing, after the redirection has been set, a private IP address of the victim device in a NAT setting of a boundary router of the location that the victim device belongs to, to a private IP address of the redirecting device.

10. A non-transitory computer readable storage medium having stored therein a control program for executing control for boundary routers, which are installed in plural locations mutually connected via a virtual network and which relay communication between devices in the locations and an external network, the control program causing a computer to execute a process comprising:
a step of performing, for a boundary router of each location other than a location that a victim device belongs to, when concentration of packets at a device in any of the locations is detected, setting of network address translation (NAT) of an IP address of the victim device, the victim device being a device where the concentration of packets has been detected;
a step of performing setting for a redirecting device installed in any of the locations, such that the redirecting device redirects access to the redirecting device, to a host under a boundary router of any of the locations other than the location that the victim device belongs to; and
a step of changing, after the redirection has been set, a private IP address of the victim device in a NAT setting of a boundary router of the location that the victim device belongs to, to a private IP address of the redirecting device.

* * * * *